United States Patent [19]

Nagai

[11] Patent Number: 4,620,518
[45] Date of Patent: Nov. 4, 1986

[54] SYSTEM FOR CONTROLLING THE IGNITION TIMING OF AN INTERNAL COMBUSTION ENGINE

[75] Inventor: Masaaki Nagai, Fuchu, Japan

[73] Assignee: Fuji Jukogyo Kabushiki Kaisha, Tokyo, Japan

[21] Appl. No.: 813,117

[22] Filed: Dec. 24, 1985

[30] Foreign Application Priority Data

Dec. 28, 1984 [JP] Japan .................................. 59-280564

[51] Int. Cl.$^4$ ............................ F02P 5/14; F02M 7/00
[52] U.S. Cl. ..................................... 123/425; 123/435
[58] Field of Search ............... 123/425, 435, 419, 436; 364/431

[56] References Cited

U.S. PATENT DOCUMENTS 4,351,281  9/1982  Geigar et al. ...................... 123/425
4,376,429  3/1983  Youngblood ....................... 123/435

FOREIGN PATENT DOCUMENTS 0027886  2/1983  Japan ................................... 123/425
0143166  8/1983  Japan ................................... 123/425

Primary Examiner—Raymond A. Nelli
Attorney, Agent, or Firm—Martin A. Farber

[57] ABSTRACT

A system is provided for quickly converging the ignition timing to a desired timing when a large deviation occurs in ignition timing. The system comprises rough correcting operation for roughly correcting the ignition timing to a desired ignition timing and for producing a completion signal when the correction reaches a complete state, fine correcting operation responsive to the completion signal for finely correcting the ignition timing by a correcting quantity. When the correcting quantity becomes larger than a predetermined value, the rough correcting operation restarts, so that a large deviation of the ignition timing is quickly deviated.

3 Claims, 11 Drawing Figures

SYSTEM FOR CONTROLLING THE IGNITION TIMING OF AN INTERNAL COMBUSTION ENGINE

BACKGROUND OF THE INVENTION

The present invention relates to a system for controlling the ignition timing of an internal combustion engine such as an automotive engine.

A learning control system for correcting the ignition timing has been proposed. The control system is adapted to advance the ignition timing so as to produce a maximum torque as long as the level of the engine knock does not exceed a tolerable level. The ignition timing stored in a RAM is corrected by a small correcting quantity (quantity of correction) and converged to a desired value little by little. The correcting quantity for the ignition timing at every updating operation is gradually reduced as the ignition timing approaches the desired value.

On the other hand, if a large disturbance, such as change of altitude or change of gasoline to another gasoline having a different octane value, occurs, the ignition timing must be corrected by a large quantity. However, in the state that the ignition timing approaches the desired ignition timing, the correcting quantity at each updating is very small as described above. Accordingly, it takes a long time to correct the ignition timing to a new desired timing.

SUMMARY OF THE INVENTION

The object of the present invention is to provide a control system which may quickly correct the ignition timing to a desired ignition timing when the ignition timing is largely deviated from the desired ignition timing.

According to the present invention, there is provided a system for controlling the ignition timing of an internal combustion engine having a microprocessor and an ignition timing control device comprising, sensing means for sensing operating conditions of the engine and for producing an engine operating condition signal, a knock sensor for sensing engine knock and for producing a knock signal.

The system comprises rough correcting means responsive to a start signal and to the engine operating condition signal and knock signal for roughly correcting the ignition timing to a desired ignition timing and for producing a completion signal when the correction reaches a complete state, fine correcting means responsive to the completion signal and to the engine operating condition signal and knock signal for finely correcting the ignition timing by a correcting quantity, deciding means for deciding a variation of the correcting quantity and for producing the start signal when the correcting quantity becomes larger than a predetermined value, whereby the rough correcting means restarts in response to the start signal.

In an aspect of the present invention, the operating conditions of the engine includes gasoline octane value and engine speed, and the fine correcting means responds to the intensity of the knock and the period in which knock does not occur.

The other objects and features of this invention will be apparently understood from the following description with reference to the accompanying drawings.

DETAILED DESCRIPTION OF THE PREFERRED EMBODIMENT

Figure 1:
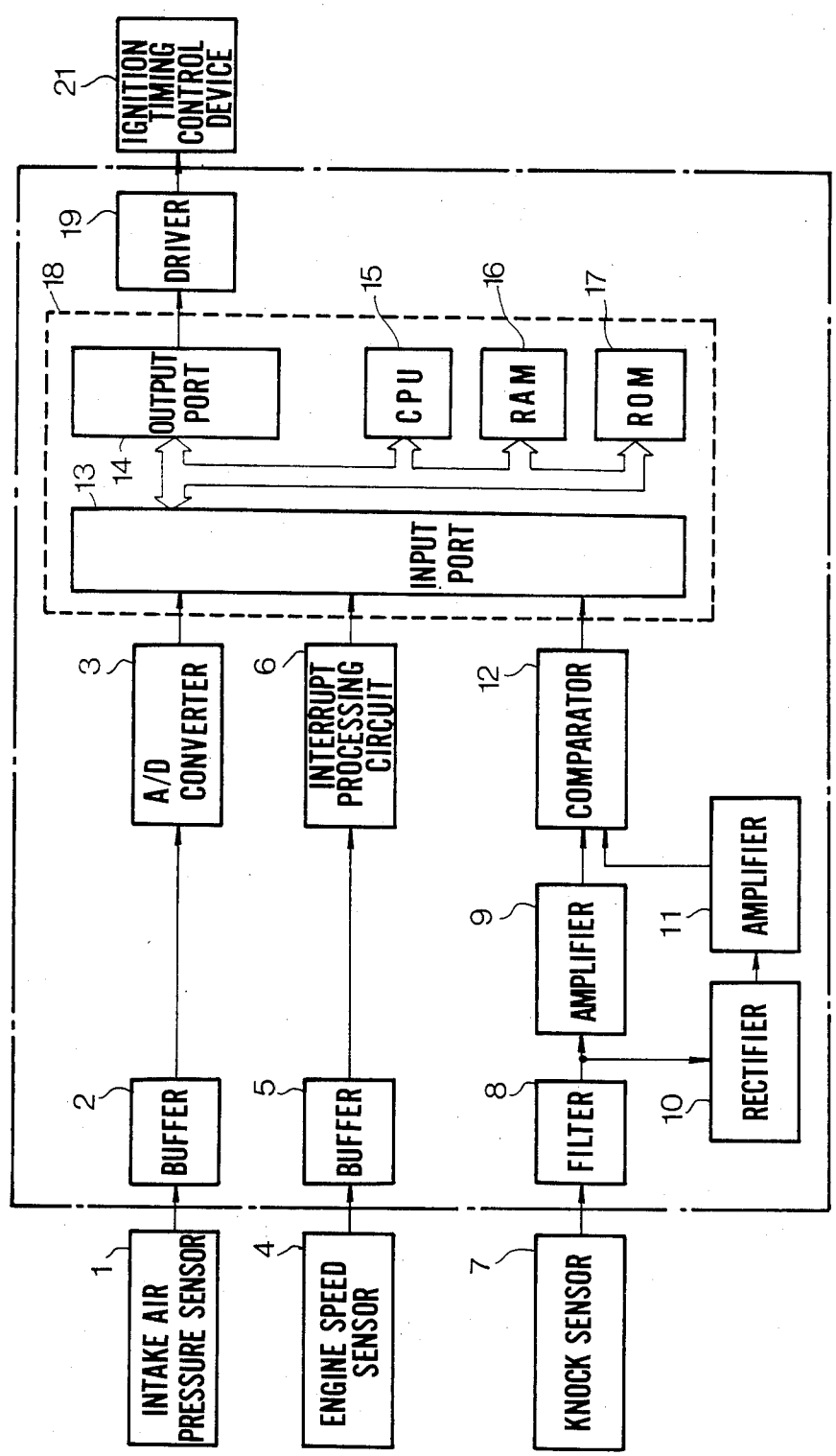
FIG. 1 is a block diagram showing a control system according to the present invention.

Referring to FIG. 1, an intake air pressure (or quantity) sensor 1, engine speed sensor 4 such as a crankangle sensor, and knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and amplifier 9, and, on the other hand, to the comparator 12 through a rectifier 10 and amplifier 11. The comparator 12 compares both inputs and produces an output signal when an engine knock having a higher level than a predetermined value generates. Outputs of the A/D converter 3, circuit 6 and comparator 12 are applied to a microprocessor 18 through an input port 13.

The microprocessor 18 comprises a CPU 15, RAM 16, ROM 17 and output port 14. The output of the microprocessor 18 is applied to an ignition timing control device 21 through a driver 19 so as to control the ignition timing in accordance with the engine operating conditions sensed by the sensors 1, 4 and 7.

Figure 5:
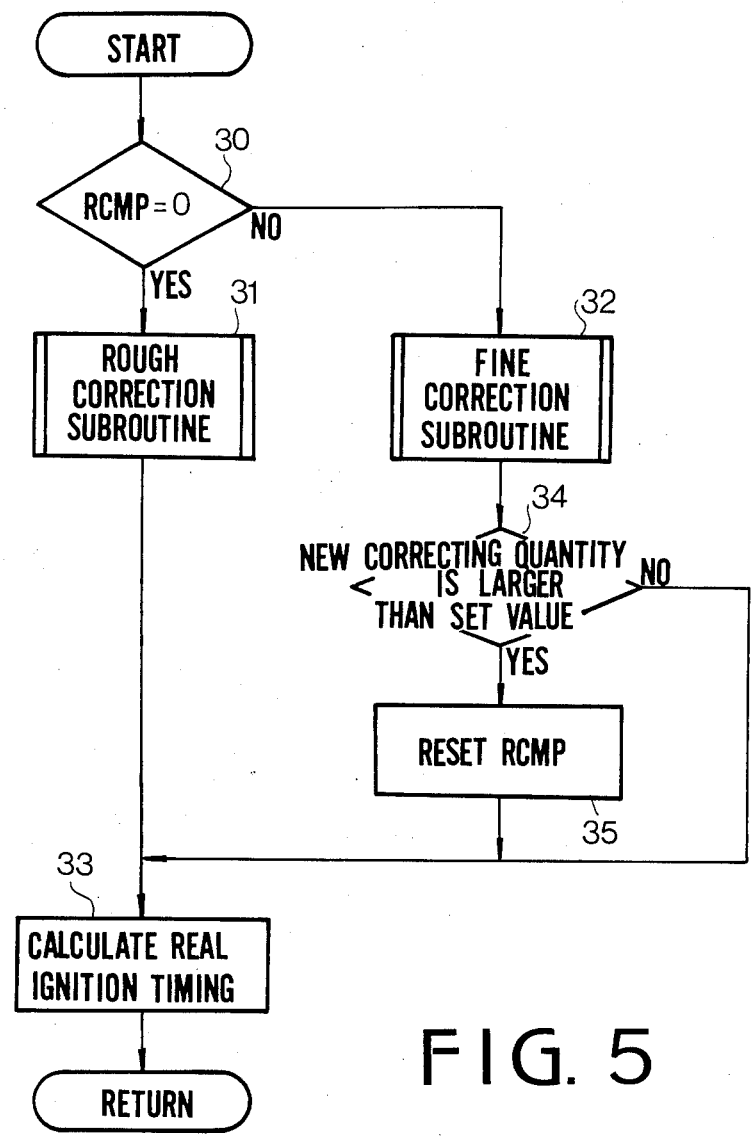
FIGS. 5 to 7b are flowcharts showing the operation of the system.

FIG. 5 shows the operation of the control system in a summary. The operation is divided into a rough correction and a fine correction. At a step 30, it is decided whether a rough correction has been executed (whether a rough correction completion flag RCMP is set). In accordance with the decision, the rough correction or fine correction is executed at a rough correction subroutine 31 or a fine correction subroutine 32. At a step 33, a real ignition timing $SRK_{real}$ is calculated. In the system of the present invention, the fine correcting subroutine 32 is so arranged that the correcting quantity at a time largely changes when a large disturbance occurs. Accordingly, at a step 34, it is decided whether a new correcting quantity is larger than a predetermined value. If the correcting quantity is larger than the set value, the rough correction complete flag RCMP is reset at a step 35. Therefore, the largely deviated ignition timing is largely corrected in the rough correcting subroutine in the next program.

The operation of the system is described in more detail hereinafter.

Figure 2:
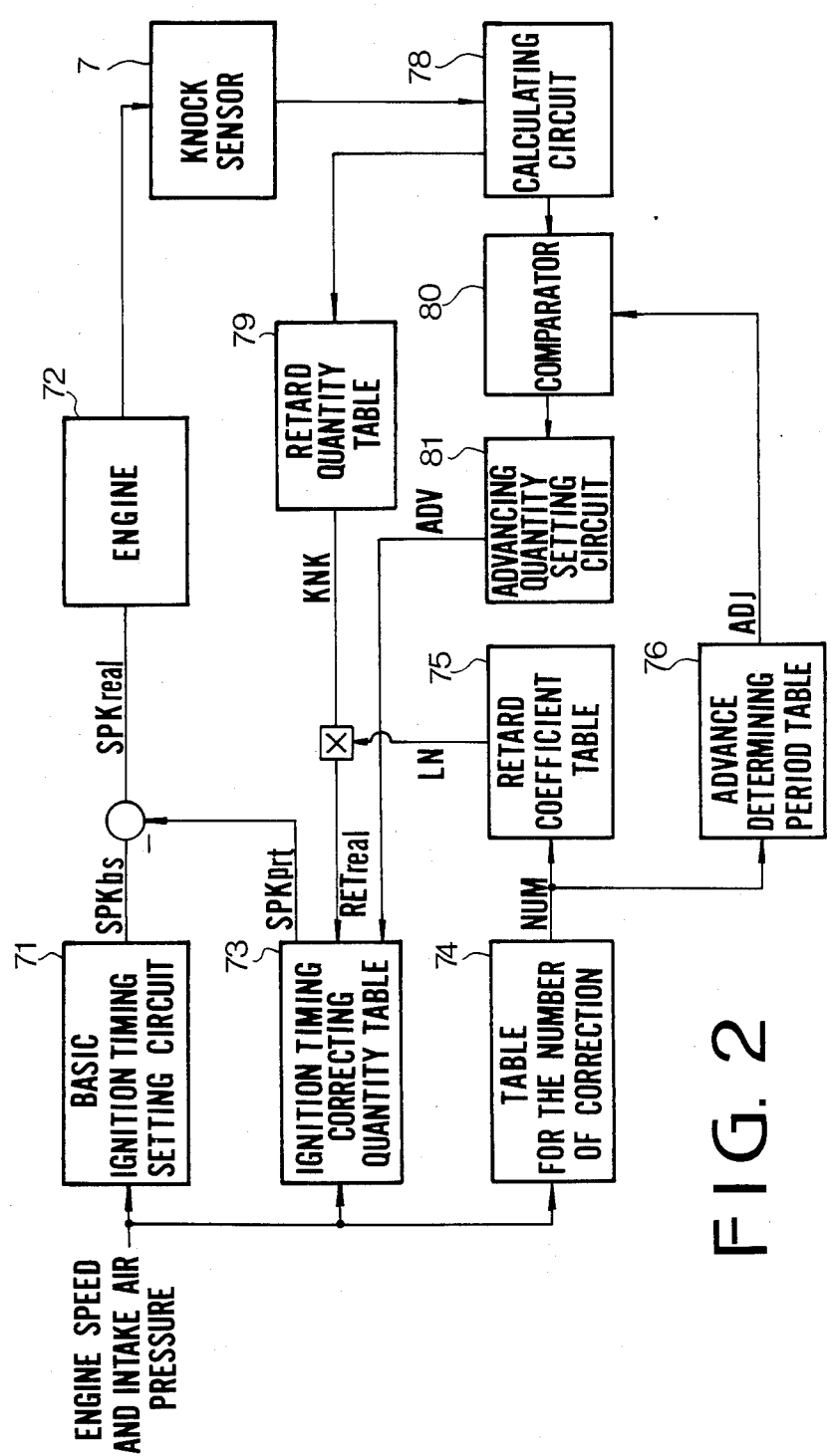
FIG. 2 is a block diagram showing a main part of the control system.
Figure 3A:
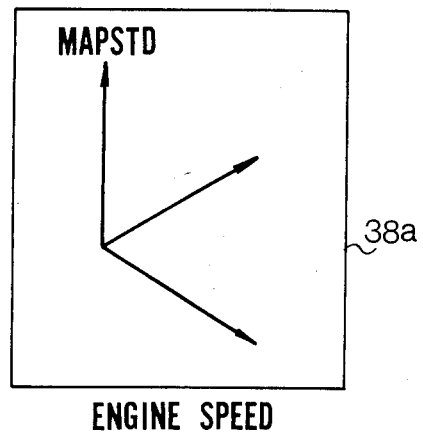
FIGS. 3a and 3b show tables storing a plurality of ignition timings.
Figure 3B:
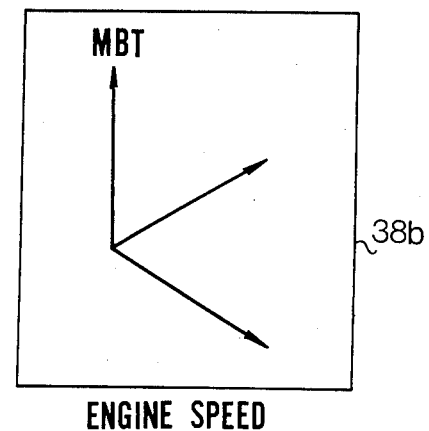
Figure 6:
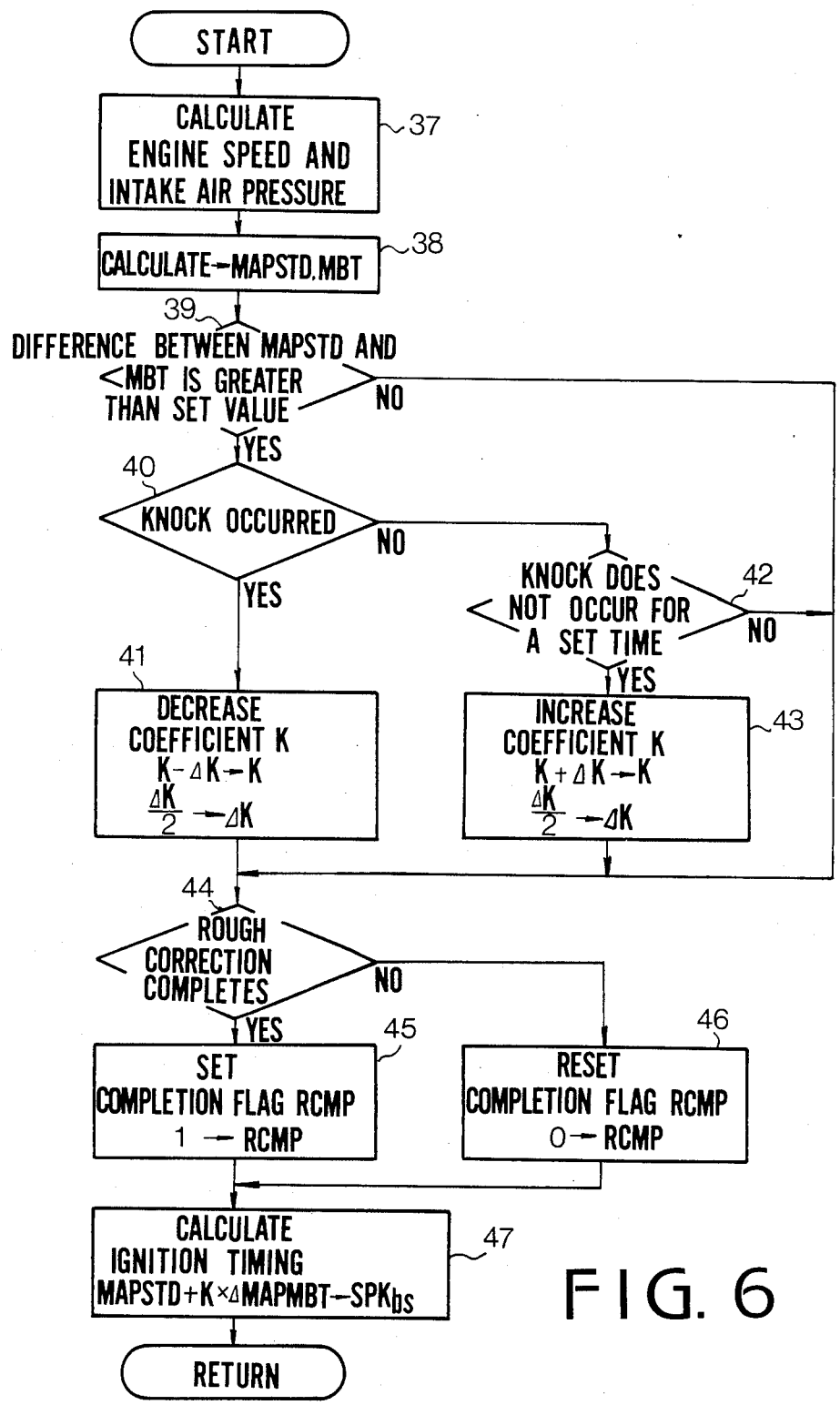

The rough correction is an operation for obtaining a basic ignition timing $SPK_{bs}$ which is calculated in a basic ignition timing setting circuit 71 shown in FIG. 2. FIG. 6 shows the operation of the rough correction. At a step 37, engine speed and intake air pressure are calculated based on output signals of sensors 1 and 4. Thereafter, at a step 38, a first maximum ignition timing MAPSTD and a second maximum ignition timing MBT are read from tables 38a and 38b (FIGS. 3a, 3b) in the ROM 17, in accordance with the engine speed and intake air pressure. The first maximum ignition timing is maximum timing for producing maximum torque with low-octane gasoline without occurring the knock and the second maximum ignition timing is maximum timing for producing maximum torque with high-octane gasoline without occurring the knock.

Figure 4:
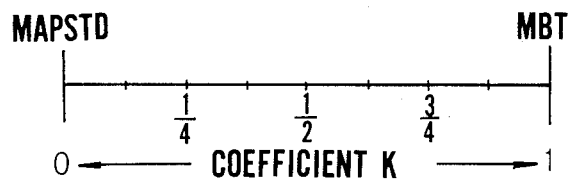
FIG. 4 shows a range of a coefficient K.

In the system, a coefficient K for correcting the ignition timing is provided. The value of the coefficient K is preliminarily set to a value between zero and 1 as shown in FIG. 4.

The coefficient K is stored in the RAM 16 and updated in accordance with engine operating conditions so as to roughly converge the ignition timing to a desired ignition timing. The updating is performed under a predetermined condition and the condition is determined at a step 39. When the difference between the first and second maximum ignition timings read from the tables 38a and 38b is larger than a predetermined degree, for example 5°, the updating is performed. Namely, the program proceeds to a step 40, where it is determined whether a knock has occurred during the program. When the occurrence of knock is determined, the program proceeds to a step 41, and if not, proceeds to a step 42. At step 41, the coefficient K is decremented by a correcting quantity $\Delta K (\Delta K = K/2)$, and the remainder $K - \Delta K$ is stored in the RAM 16 as a new coefficient for the next updating. Accordingly, the correcting quantity $\Delta K$ at the next updating is $(K - \Delta K)/2$. Namely, the correcting quantity is a half of the coefficient K at updating. More particularly, if the initial coefficient is $\frac{1}{2}$, the correcting quantity is $\frac{1}{4}$, and if it is 0 or 1, the correcting quantity is $\frac{1}{2}$ as seen from FIG. 4.

At the step 42, it is determined whether the engine has operated without occurring knock for a predetermined period. When knocking does not occur for the period, the coefficient K is incremented by the correcting quantity $\Delta K$ at a step 43.

After the updating of the coefficient K at step 41 or 43, it is determined whether the rough correction is completed at a step 44. As will be understood from the above description, the correcting quantity $\Delta K$ decreases as the number of the correction increases. In the system, when the correcting quantity reaches a predetermined small value, the rough correction is completed. Accordingly, if quantity $\Delta K$ reaches the predetermined value, a rough correction completion flag RCMP is set at a step 45, or if not, the flag is reset at a step 46. On the other hand, the total correcting quantity $SPK_{prt}$ and the number of correction NUM of ignition timing are stored in an ignition timing correcting quantity table 73 and a table 74 (FIG. 2) for the number of correction. At a step 47, a basic ignition timing $SPK_{bs}$ is calculated by a following formula $$SPK_{bs} = MAPSTD + K \times \Delta MAPMBT \quad (1)$$

where $\Delta MAPMBT = MBT - MAPSTD$

The basic ignition timing is applied to an engine 72 (FIG. 2) to operate the engine at the ignition timing. The coefficient K is stored in the RAM 16. If the rough correction is not completed, the coefficient K is updated at the next program so as to roughly converge the ignition timing to a desired ignition timing as described above. It will be understood that if the initial coefficient K is 0, the basic ignition timing $SPK_{bs}$ calculated by the formula (1) is the maximum ignition timing MAPSTD at the first program. The basic ignition timing $SPK_{bs}$ obtained by the rough correction is further corrected by the fine correcting operation as described hereinafter.

Figure 7A:
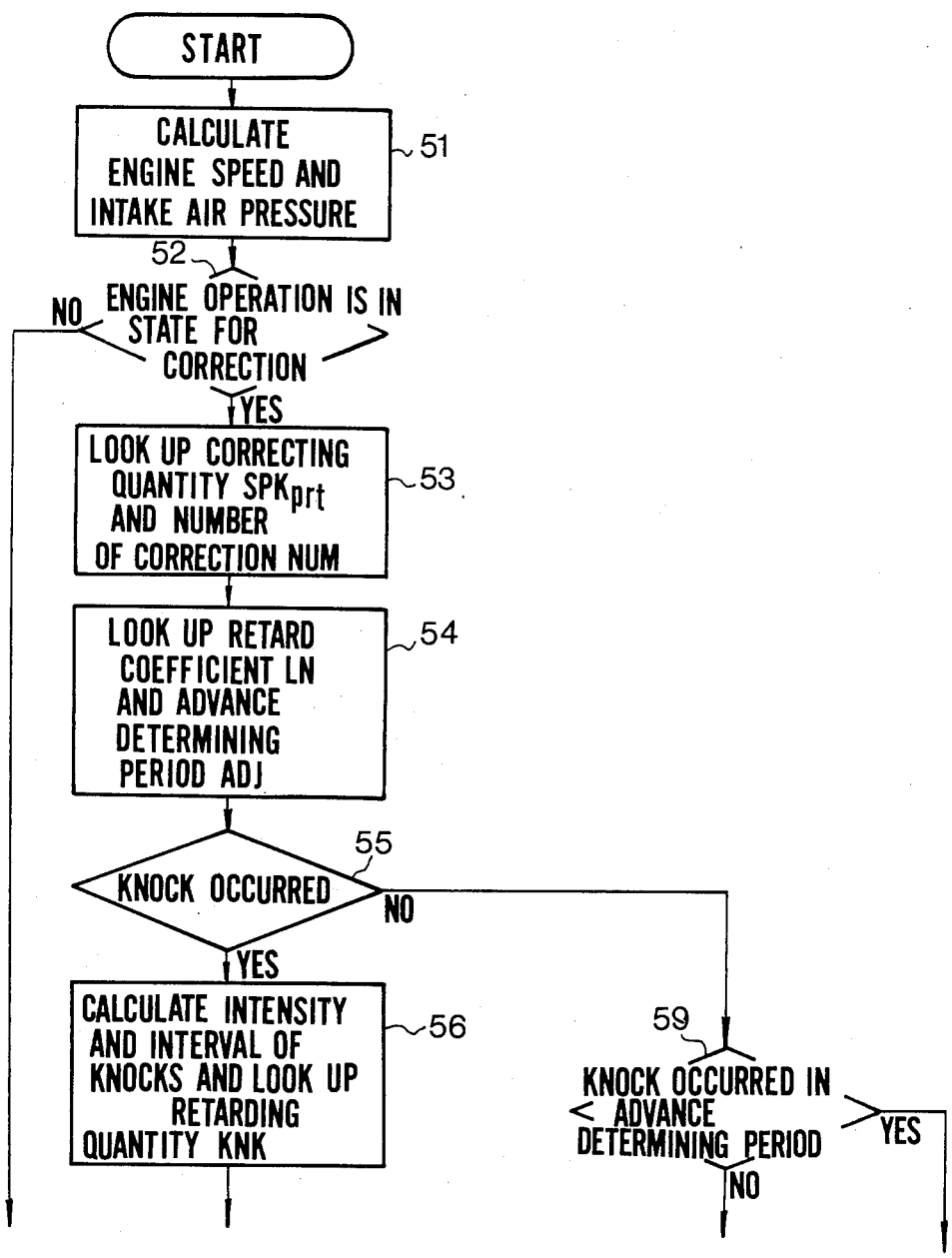
Figure 7B:
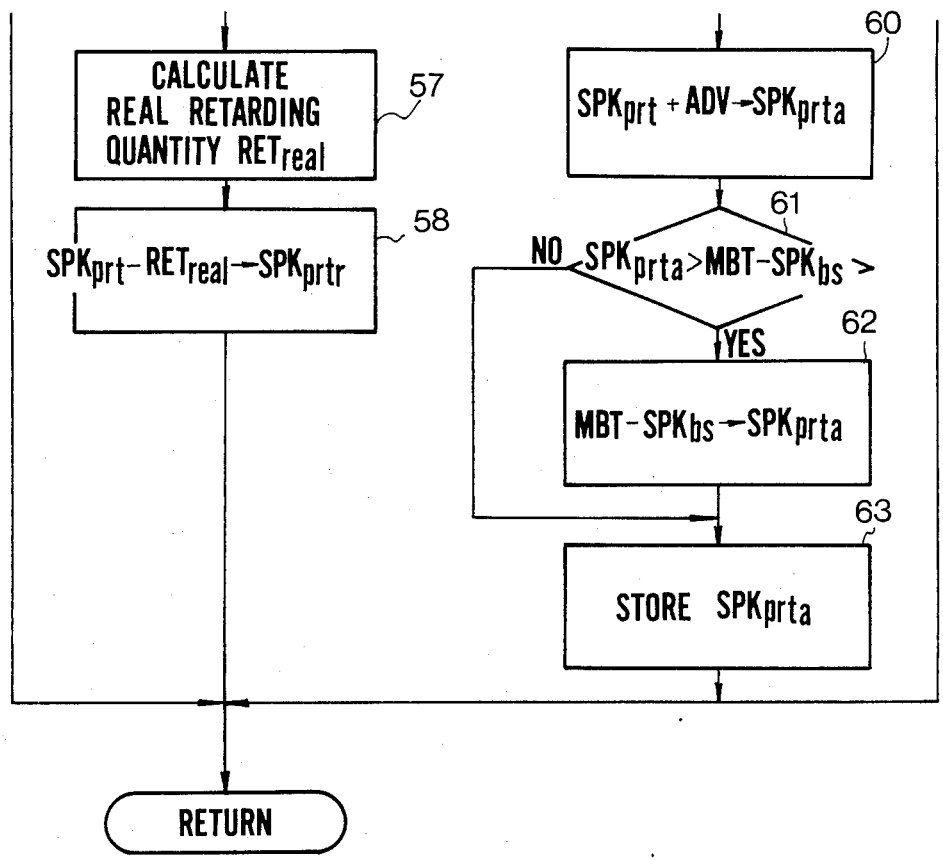
Figure 8A:
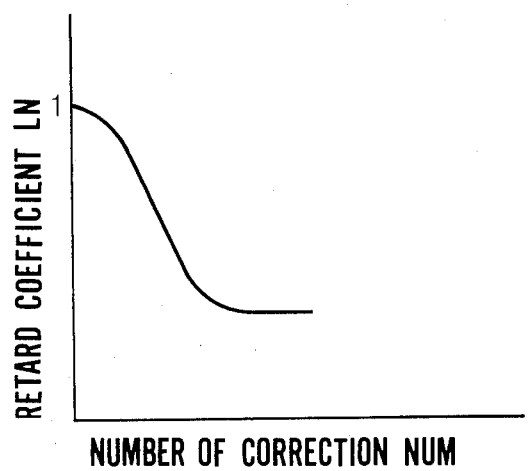
FIGS. 8a and 8b show a retard coefficient table and an advance determining period table, respectively.
Figure 8B:
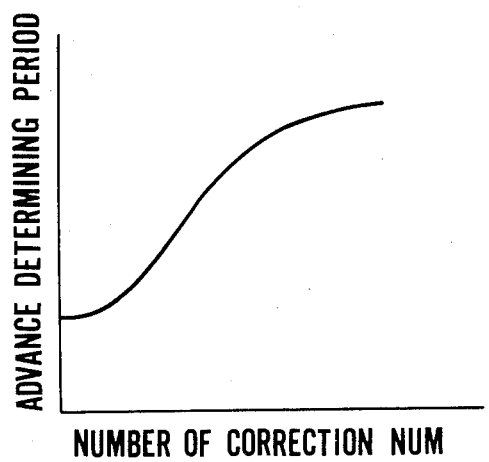

Referring to FIGS. 7a and 7b, at a step 52, it is decided whether the engine operation is in a range which is proper to correct the basic ignition timing $SPK_{bs}$. If it is in the range, the correcting quantity $SPK_{prt}$ and the number of correction NUM are read from tables 73 and 74 at a step 53. Then, at a step 54, a retard coefficient LN for retarding quantity RET is looked up from a retard coefficient table 75 (FIG. 2) of FIG. 8a in accordance with the number of correction NUM, and an advance determining period ADJ is looked up from an advance determining period table 76 (FIG. 2) of FIG. 8b in accordance with the number of correction NUM. Thereafter, the program proceeds to a step 55, where it is decided whether a knock has occurred during the program. When the occurrence of knock is determined, the program proceeds to a step 56, and if not, it proceeds to a step 59. At step 56, the intensity of the knock and the interval of knocks are calculated at a calculating circuit 78 (FIG. 2), and then, retarding quantity KNK is looked up from a retarding quantity table 79 in accordance with the intensity and the interval of knock. At a step 57, a real retarding quantity $RET_{real}$ is calculated by multiplying the retarding quantity KNK and retard coefficient LN together ($RET_{real} = KNK \times LN$). Thereafter, the program proceeds to a step 58, where the correcting quantity $SPK_{prt}$ stored in the table 73 is subtracted with the real retarding quantity $RET_{real}$ to obtain a new correcting quantity $SPK_{prtr}$ which is stored in the table 73.

On the other hand, at the step 59, it is decided whether a knock occurred in the advance determining period ADJ, which is performed at a comparator 80 in FIG. 2. When knock does not occur in the period, the program proceeds to a step 60, where an advancing quantity ADV of a constant small value is added to the correcting quantity $SPK_{prt}$ to obtain a new correcting quantity $SPK_{prta}$ which is performed in an advancing quantity setting circuit 81 in FIG. 2 and stored in the table 73. Thereafter, at a step 61, it is determined whether the new correcting quantity $SPK_{prta}$ is larger than a limit value which is obtained by subtracting the basic ignition timing $SPK_{bs}$ from the maximum ignition timing MBT ($MBT - SPK_{bs}$). When the new correcting quantity $SPK_{prta}$ is smaller than the limit value, the new correcting quantity is stored in the table 73 at a step 63. If it is larger than the limit value, value of $MBF - SPK_{bs}$ is used as a new correcting quantity (at a step 63) and stored in the table 73.

When a large knock occurs by a large disturbance, the retarding quantity $RET_{real}$ obtained at step 57 increases largely. Accordingly, the new correcting quantity $SPK_{prtr}$ obtained at step 58 increases. If the quantity $SPK_{prtr}$ is larger than the above mentioned predetermined value, the rough correction complete flag RCMP is reset at step 35 (FIG. 5). Accordingly, the next program is executed in the rough correction subroutine 31 to correct the coefficient K so as to largely correct the deviation in ignition timing. Thus, the ignition timing is quickly converged to a new desired ignition timing.

On the other hand, if a desired ignition timing is largely moved to the advance direction by a large disturbance, the advancing quantity ADV is added to correcting quantity $SPK_{prt}$ many times at step 60. Accordingly, the new correcting quantity $SPK_{prta}$ becomes large. If the quantity is larger than the set value, the rough correcting operation is executed as described above.

While the presently referred embodiment of the present invention has been shown and described, it is to be understood that this disclosure is for the purpose of illustration and that various changes and modifications may be made without departing from the scope of the invention as set forth in the appended claim.

What is claimed is:

1. A system for controlling the ignition timing of an internal combustion engine having a microprocessor and an ignition timing control device comprising:

sensing means for sensing operating conditions of the engine and for producing an engine operating condition signal;

a knock sensor for sensing engine knock and for producing a knock signal;

rough correcting means responsive to a start signal and to the engine operating condition signal and knock signal for roughly correcting the ignition timing to a desired ignition timing and for producing a completion signal when the correction reaches a complete state;

fine correcting means responsive to the completion signal and to the engine operating condition signal and knock signal for finely correcting the ignition timing by a correcting quantity;

deciding means for deciding a variation of the correcting quantity and for producing the start signal when the correcting quantity becomes larger than a predetermined value, whereby the rough correcting means restarts in response to the start signal.

2. The system according to claim 1 wherein the operating conditions of the engine includes gasoline octane value and engine speed.

3. The system according to claim 2 wherein the fine correcting means responds to the intensity of the knock and the period in which knock does not occur.

* * * * *